United States Patent [19]
Klein

[11] 3,988,852
[45] Nov. 2, 1976

[54] HOOK CONNECTOR

[76] Inventor: Gerald B. Klein, 13451 Stuart Court, Broomfield, Colo. 80020

[22] Filed: Aug. 11, 1975

[21] Appl. No.: 603,347

Related U.S. Application Data

[63] Continuation-in-part of Ser. No. 335,081, Feb. 20, 1973, Pat. No. 3,898,760.

[52] U.S. Cl. ............................. 43/44.83; 43/44.91
[51] Int. Cl.² ....................................... A01K 91/04
[58] Field of Search ............ 43/44.83, 44.98, 43.15, 43/42.37, 44.9, 44.91; 85/21

[56]  References Cited
UNITED STATES PATENTS

| | | | |
|---|---|---|---|
| 551,844 | 12/1895 | Benedict | 43/44.83 |
| 1,100,252 | 6/1914 | O'Neill | 85/21 |
| 1,425,384 | 8/1922 | Kelly | 85/21 X |
| 2,241,367 | 5/1941 | Sarff | 43/43.15 X |
| 2,533,418 | 12/1950 | Benoit | 43/44.83 |
| 2,674,824 | 4/1954 | Werner | 43/44.98 X |
| 3,032,911 | 5/1962 | Wilhelmi | 43/42.37 |
| 3,460,285 | 8/1969 | Perkins | 43/44.9 |

Primary Examiner—Louis G. Mancene
Assistant Examiner—Daniel J. Leach
Attorney, Agent, or Firm—Dennis O. Kraft

[57]  ABSTRACT

A hook connector for connecting a snell, line or leader to the shank of a hook. The connector is formed as a short, resilient member of a tough, hard, synthetic resin such as nylon, which may be connected to or molded on a hook shank. The connector in one embodiment has a central passageway therethrough with a larger diameter portion meeting a smaller diameter portion at a shoulder therein. A snell is attached to the connector by threading it through the passageway, knotting the end of the snell, and drawing the snell back into the larger diameter portion of the passageway until the knot abuts the shoulder and engages the side wall of the passageway with a tight fit. In another embodiment, the passageway terminates at a side opening socket wherein the knot in the snell is snugly fitted.

8 Claims, 13 Drawing Figures

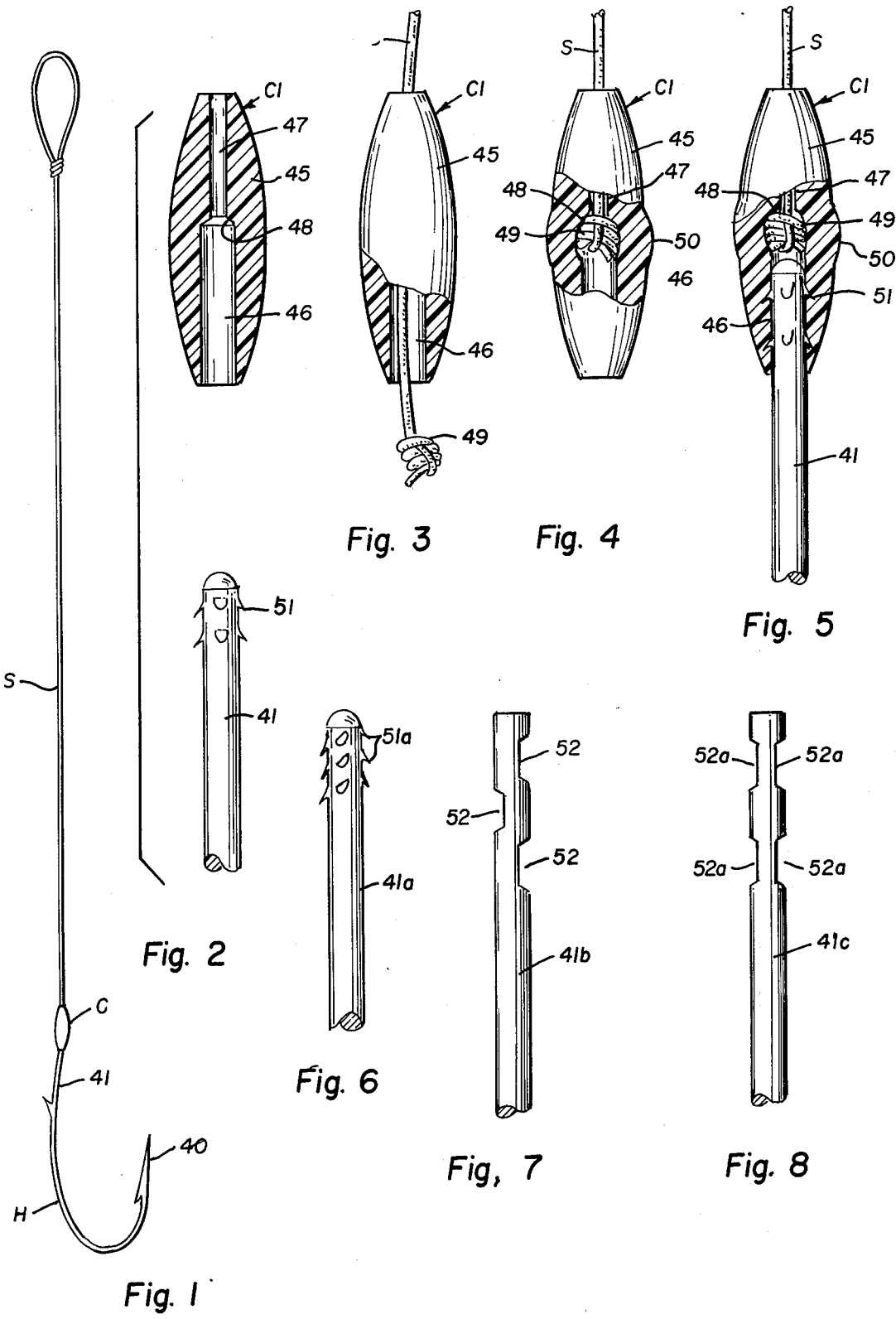

HOOK CONNECTOR

This invention is a continuation-in-part of my application for a hook connector, Ser. No. 335,081, filed Feb. 20, 1973, now U.S. Pat. No. 3,898,760, to claim subject matter disclosed but not claimed in that application and to also disclose and claim other subject matter.

This invention also relates to my applications for a Leader with Connector filed Mar. 24, 1971, Serial No. 128,015, now U.S. Pat. No. 3,717,907, and for a Leader Connector filed July 24, 1972, Ser. No. 274,307, now U.S. Pat. No. 3,857,645, since the subject matter disclosed in the present application is related to the subject matter of these former applications.

This invention relates to the attachment of fishhooks to snells, leaders or lines, and more particularly to a connector at the shank end of a fishhook for the attachment of a snell, line or leader thereto. As such, the invention will be hereinafter called a "hook connector." The invention will be described as connecting the fishhook to a snell. However, it is to be understood that the invention may also be used with lines or leaders since snells, lines and leaders are connected to fishhooks in the same manner.

A hook connector may be used with hooks for bait fishing and also for artificial lures such as flies and the like. Conventionally, a hook for such purposes is formed with an eye at its shank end. The end of a snell is threaded through this eye and then tied upon the shank of the hook. The knots used for this purpose must be double-looped and the tying of such knots requires both skill and time. Special knots are necessary since the nylon strands commonly used for snells, lines and leaders are very slippery when wetted and when tied with ordinary knots, they will slip loose from a hook, usually when a good fish is caught. Another disadvantage resides in the fact that a hook eye can cut a monofilament leader or snell.

Thus, a major expense in the manufacture of fishhooks with the snells attached is the labor involved in properly tying the snells onto the fishooks, and in tying the snells onto small artificial flies. On the other hand, where a fisherman ties his own snells, or leaders onto his hooks or flies, he must carefully tie proper knots onto the hook to prevent the snell, or leader, from slipping when it is wet. This requires a high degree of skill and patience, and can become difficult, especially when a fisherman is not in a well lit shelter, but is along a bank or in a boat and when the weather conditions are not the best.

Accordingly, there is a real and definite need for an improved and simplified mode of connecting a snell onto a hook. Such a need is clearly apparent in production lines of a hook manufacturing company where labor costs are constantly increasing. Also, an easier mode of connecting a snell onto a hook has long been needed in the field for the many fishermen who prefer to tie hooks onto their snells, lines or leaders at the time they are to be used. The present invention was conceived and developed with such considerations in view and the invention comprises, in essence, a small connector of a strong but resilient material such as nylon, having one end affixed to the shank of a hook and having the other end adapted for connection with a snell.

It follows that a primary object of the invention is to provide a novel and improved hook connector which permits a line or a snell to be neatly and securely attached to the hook.

Another object of the invention is to provide a novel and improved hook connector for securing a snell onto the shank of a hook, which is a small, neat-appearing member snugly embracing the hook shank, has a diameter much smaller than the eye of a conventional hook and is thus especially suitable for threading bait such as worms upon the hook and upon the snell or leader beyond the hook.

Another object of the invention is to provide a novel and improved hook connector which permits a snell to be connected thereto by a simple reliable knotting operation to make the same cheaper for industrial operations and much easier for fishermen who tie the hooks to their own tackle.

Another object of the invention is to provide a novel and improved hook connector which permits a hook to be quickly and easily tied to a line or a leader with comparatively simple knots to make the entire procedure easier for fishermen and when desired, to eliminate short, factory tied snells completely.

Another object of the invention is to provide a novel and improved hook connector which holds the knot of a snell connecting therewith in a resilient, yieldable seat and which also may be connected to the hook in a manner which provides a favorable distribution of stress at the connection and without contacting the metal hook to better protect the snell against sudden jerks.

Another object of the invention is to provide a novel and improved hook connector for a fishhook which may be angled at any selected direction to more effectively direct the point of a hook and help secure the same in the mouth of a fish.

Other objects of the invention are to provide a novel and improved hook connector for a fishhook which is simple, strong, economical and versatile, and requires only a minimum of skill to use.

With the foregoing and other objects in view, my present invention comprises certain constructions, combinations and arrangements of parts and elements as hereinafter described, defined in the appended claims, and illustrated in preferred embodiment by the accompanying drawing in which:

FIG. 1 illustrates a fishhook having a snell secured to it by the improved hook connector.

FIG. 2 is an exploded view of one embodiment showing the connector in section and the end portion of a hook shank modified to fit in the connector.

FIGS. 3, 4 and 5 illustrate sequential steps in attaching the end of a snell to the connector shown at FIG. 2 and thereafter attaching the connector to the shank of a hook.

FIG. 6 shows the end portion of a hook shank, which is similar to FIG. 2, but with barbs in a thread-forming array.

FIG. 7 shows the end portion of an indented hook shank which may be used where the connector is molded upon the shank.

FIG. 8 shows an end portion of a hook shank similar to FIG. 7, but indented in a different manner.

Figure 9:
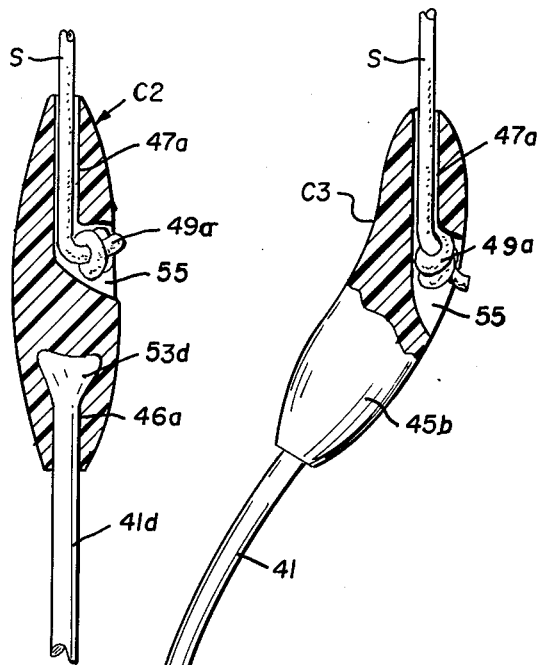
FIG. 9 is a sectional view of another modified construction of a hook connector for securing a snell to a hook shank where the connector is molded onto the hook shank.

Referring more particularly to the drawing, FIG. 1 exemplifies a hook H connected to a snell S by an improved connector C. The hook H is formed as a curved barbed point 40 on a shank 41. The snell S is a short strand of nylon having one end knotted or molded to form a connective eye. Such a snelled hook may be attached to the end of a line or attached to a leader at the end of a line. Many lines and leaders are of the same material as the snell and it is also a common practice to attach a hook directly to the end of a line or leader instead of a snell.

A first embodiment of the connector C1 is shown at FIGS. 2 – 5. This connector is formed as a small, elongate body 45 which may be cigar-shaped as shown, or more nearly cylindrical or tubular. This body is essentially symmetrical about its longitudinal axis. It is formed of nylon or a similar strong, resilient material and it may be reinforced with fiberglass or the like. This connector will ordinarily be manufactured by injection molding processes as an economical, low-cost operation. The body has a diameter which need not be many greater than the diameter of a hook shank 41. The drawings show the diameter of the body as being approximately three times the hook shank diameter but this diameter is preferably much less and even less than twice the hook shank diameter. The same will depend to a great extent upon the strength and rigidity of the material forming the connector and the strength of the snell or leader attached to the connector, all as hereinafter further described.

An axial passageway extends through this body 45 with a larger diameter portion 46 at one end and a smaller diameter portion 47 at the other end, and these portions meet at a shoulder 48 within the body. The larger diameter portion 46 forms a socket to receive the end of the hook shank and thus, this portion will be hereinafter called a "shank socket 46." The smaller diameter portion 47 provides a passageway through which the snell S may be threaded with only a small clearance about the snell and thus, this portion will be hereinafter called a "snell passageway 47." In using this embodiment shown at FIGS. 2 – 5, the diameter of a hook shank 41 will be larger than the snell S, although the difference in diameter will not be great. Thus, when the shank socket 46 in the connector is proportioned to receive a hook shank, it will also be large enough to permit the end of a snell S to be extended through the snell passageway 47 and thence, through the socket 46. A knot 49 is then tied at the end of the snell S as shown at FIG. 3. The snell is then drawn back to pull the knot 49 into the shank socket 46 to abut against the shoulder 48 within the body and thereby secure the snell to the connector with a tight fit as shown at FIG. 4.

The knot may be specially tied and in a manner which will prevent the snell from slipping and untying whenever the snell is pulled. Ordinarily, in a conventionally tied hook, a simple overhand knot and a FIG.-8 knot are unsatisfactory and instead, special knots must be used to tie the snell to a hook. Both nylon and silk gut snells or leaders are very slippery, especially when they are wet. This requirement for a specially tied knot may not be necessary in the connector C1, or in the other connectors hereinafter described, provided that the diameter of the knot 49 is such that it will fit tightly into the socket 46. With a tight fit, even a simple overhand knot will not slip and untie. Thus, a tight fit of the knot in the socket is the preferred mode of securing the snell knot 49 in the socket 46.

A tight fit is definitely preferred in this knotted connection of the snell to the connector. Some variations of structure are possible to better effect this tight fit of the knot within the socket 46. For example, the socket 46 may be tapered slightly or the diameter of the socket 46 may be reduced adjacent to the shoulder 48 as by a step-like change or in any other suitable manner not shown.

It is essential that the end of the hook shank 41 fit tightly in the socket 46 and resist a substantial pull. The shank may be thrust, or otherwise fitted, into this socket 46 after the snell S is knotted and the knot 49 is pulled in place against the seat 48 as shown at FIG. 5. Accordingly, the socket 46 may be slightly smaller than the diameter of the hook shank 41 so that it will stretch to produce a desirable, tight fit. It was found that the natural grab effect between the shank and the connector fitted in this manner, would be adequate to hold the snell onto the end of a hook and in tests the snell would often break before the connector C1 would slip off the hook shank.

However, it was found desirable to provide a more positive holding action by the connection between the hook shank 41 and the connector C1, and holding means were provided, such for example, as the barbs 51 on the shank 41 shown at FIGS. 2 and 5. These barbs are slanted away from the end of the hook to permit the shank to be easily inserted into the socket 46 as shown at FIG. 5, but to prevent its withdrawal. Tests demonstrated that the force required to pull the hook from the socket was substantially increased, to the point where the nylon connectors would sometimes pull apart instead of releasing from the hook shank and in every instance, the force to pull the connector from the hook shank exceeded the strength of a snell.

Other modes of securing a hook shank into a socket are possible. For example, the connector may be welded to the shank by heat, solvents, cement or ultrasonic action. A preferred mode for fitting is to mold the connector onto the shank. Various types of shanks may be used. Instead of being straight, the shank may be undulated, serrated or stepped to more tightly fit into a connector socket.

The hook shank 41a, shown at FIG. 5, provides for an array of barbs 51a, similar to the barbs 51, shown at FIG. 2, but with the barbs being arranged in a helical pattern so that the shank 41a may be turned into the socket 46 as if the barbs 51a constituted threads. In this construction, the barbs 51a will cut a thread-like slit in the connector socket 46 and the resulting fit of the shank 41a and connector will be very secure.

The hook shank 41b, shown at FIG. 7, provides for notches 52 to help lock a connector onto the hook shank when it is molded into place. These notches do not significantly enlarge the diameter of the shank even if they are formed by swaging. The hook shank 41c, shown at FIG. 8, provides for opposing pairs of notches 52a so that the end of the shank may be locked into the connector when the connector is molded onto the hook shank, as hereinafter further described.

The connector C1, shown at FIGS. 2 – 5, is constructed to require insertion of the hook shank 41 into the socket 46. In contrast, a connector C2, the first modified embodiment shown at FIG. 9, is necessarily molded upon a hook shank 41d. The shank 41d has an enlarged head 53d at its end. The snell passageway 47a terminates at a side opening socket 55 near the center of the connector, wherein the knotted end 49a of a snell S is fitted with a tight, snug fit. This mode of forming a connector C2 upon a hook shank is analogous to forming a connector upon a fly line or upon a leader which was disclosed in my prior applications.

In this construction, the snell S is threaded into the passageway and out the side opening socket 55. The end is then knotted, as at 49a and pulled back into the side opening socket 55 which is proportioned to hold the knotted end in place with a tight fit. It is desirable that this knot 49a fit tightly in the socket, with the resilient connector C2 being stretched slightly to effect a desirable tight gripping action. This socket 55 may assume various forms, such as circular, oval or even a distorted hexagonal form. The connector C2, with a side opening 55 such as shown at FIG. 9, and also other connectors with side openings, are especially suitable for field use since the connectors may be attached to hooks at the factory, but the snells, or lines or leaders, may be attached by a fisherman in the field with little effort.

Figure 10:
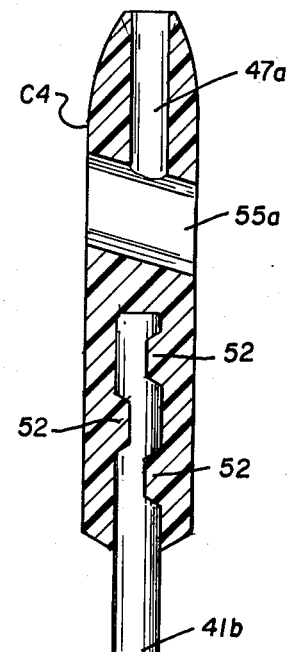
FIG. 10 shows yet another modified construction of a hook connector where the body of the connector is angled to orient the hook at an inclinaton with respect to the snell attached thereto.

The connector C3, the second modified embodiment, shown at FIG. 10, is similar to the connector C2, above described. However, the body 45b is curved near its center portion to angle the shank of the hook H with respect to the alignment of the snells as illustrated. The snell passageway 47a and the side opening 55 are essentially the same as heretofore described. This mode of hook alignment is advantageous in using certain types of hooks since it will place the point of the hook more nearly in line with a pull of the snell or leader when the fishing tackle is in use, to better set the hook and hold the fish after it is hooked.

Figure 11:
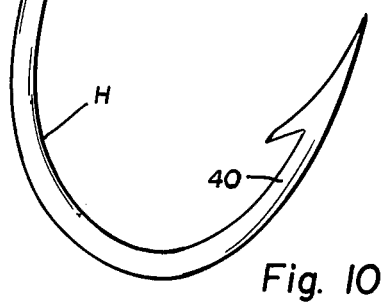
FIG. 11 is a sectional view of a preferred form of a hook connector molded onto the shank shown at FIG. 7.

The connector C4 in FIG. 11 illustrates a preferred commercial embodiment of a hook connector which is molded upon the shank 41b of a hook such as illustrated at FIG. 7. The notches 52 in this shank secure the connector C4 in place. Other shank offset patterns could be used to hold the connector in place such as the enlargement 53d illustrated at FIG. 9. However, the offsets 52 of FIG. 7 or offsets 52a of FIG. 8 are cut or pressed in the sides of the shank and do not materially enlarge any portion of the shank. Thus, they are definitely preferred because it is desirable to keep the diameter of the connector C4 as small as possible as hereinafter further described.

The connector includes an axial snell passageway 47a at its extended end which extends by a side opening 55a in the wall of the connector. This side opening 55a may be slot-like in form and may extend completely through the connector. A snell or leader is connected to the end of the connector by extending the snell through the passageway 47a and thence to the outside of the connector through the side opening 55a. This connector C4 may be connected to a snell in any other suitable manner.

Figure 12:
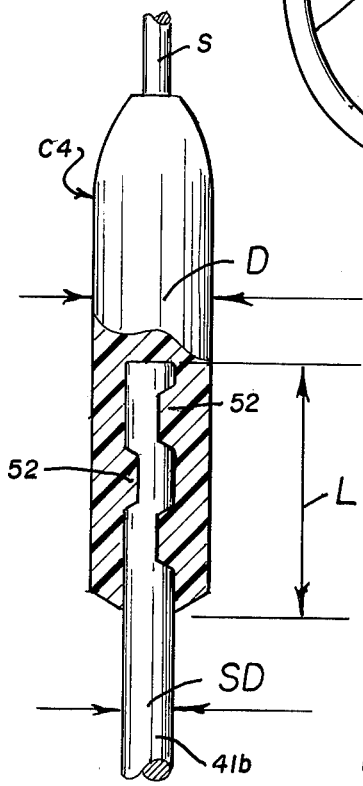
FIG. 12 is a view, partially in section, indicating certain limitations in the relative proportions of the hook connector shown at FIG. 11.

By using nylon, the preferred synthetic resin plastic because of its relatively high strength, it was discovered that the diameter of this connector need be only slightly greater than the hook shank diameter. Referring to FIG. 12, the diameter of the hook shank SD may be used as a basis for forming the connector. The diameter D of the connector needs to exceed the diameter SD of the hook shank only an amount sufficient to envelope the hook shank and develop enough strength to resist the pull of the snell S. The elimination of the conventional eye on a hook permits certain types of bait to be more easily and more effectively threaded upon the hook. The eyeless type of hook is thus desirable and manufacture of the same is presently accomplished by wrapping a snell on a straight shank with thread, a very expensive type of hook.

Figure 13:
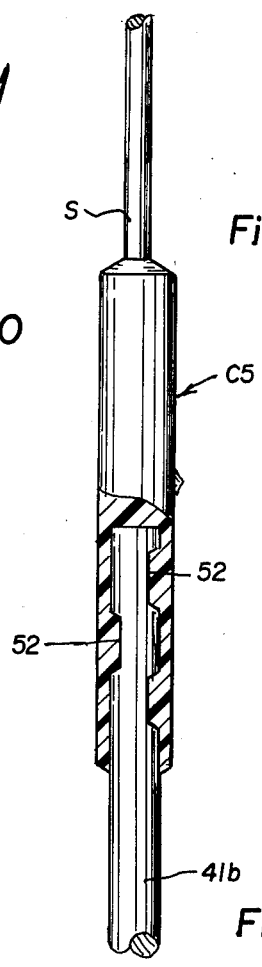
FIG. 13 is a view of a hook connector on the shank of a hook which is illustrated as being proportioned, with respect to the hook shank diameter, more nearly to the proportions of a commercial unit.

It was found that the diameter D of the connector need be no more than approximately 1½ times the hook shank diameter SD, although the drawings, FIGS. 11 and 12, show this diameter D to be approximately 3 times the hook shank diameter. This is an exaggeration for purposes of illustration and is the limit for a practical, usable connector. If the diameter D of the connector were greater, one of the important advantages of eliminating the eye of a hook is lost. FIG. 13 shows a connector C5 which is more nearly proportioned to the size of a commercial type, the diameter of the connector C5 shown as being approximately 1½ times the shank diameter SD. The manner in which the snell S, or leader, is fitted to the connector may be the same as heretofore described, or if it is a snell, it may even be integral with the connector as suggested by FIG. 13. If a snell is used, the leader will then be connected to the snell in a conventional manner.

The length of that portion of the connector on the shank of the hook need not be great to attain sufficient holding power. It was found that if this length L was at least 4 times the shank diameter SD, the connector would be securely held by the hook shank. However, as a practical matter, this length L may be as much as 5 or 6 times the hook shank diameter SD. A greater length is unnecessary though not necessarily objectionable.

I have now described my invention in considerable detail. However, it is obvious that others skilled in the art can build and device alternate and equivalent constructions which are nevertheless within the spirit and scope of my invention. Hence, I desire that my protection be limited not by the constructions illustrated and described, but only by the proper scope of the appended claims.

What is claimed is:

1. A connector comprising in combination with a fishing line:
    a rod-like connecting member constructed of resilient, slightly stretchable material and having at least a first axial passageway extending into it from one end, and an end opening at the other end intersecting said first passageway;
    said first passageway being slightly larger in cross section than the diameter of the fishing line to receive the same;
    the other end of said member being coupled to a fish handling implement to be joined with said fishing line through said member;
    said first passageway extending to the end opening with the width of the end opening being at least as great as the diameter of the said first passageway but not exceeding the diameter of a knotted end of said line, said end opening defining gripping means whereby the end of said line may be threaded into the first passageway, extended from the end opening, knotted and then pulled back into the end opening with the knotted end being forced into the end opening with a slight stretching of the resilient connector about the knotted end to thus effect a tight fit and a gripping of the knotted end of said line.

2. A connector as defined in claim 1, wherein: said fish handling implement joined to said other end of the connector is disposed in said end opening.

3. A connector as defined in claim 2, wherein: said fish handling implement is the shank of a fishing hook, said shank being securely held in said end opening.

4. A connector mounted upon the end of a hook shank for attaching a hook to a leader or the like and comprising, in combination with a fishhook having a shank of selected diameter D:
   a. a body of synthetic resin material having a strength and resilience characteristic of nylon and capable of being molded upon the end of the hook shank with one end of said body encapsulating the end of the hook shank at least along a distance L of said shank equal to 4 times the hook shank diameter D to become an integral extension of the hook shank, said body being formed generally as an elongated member having a diameter no more than approximately twice as great as the diameter of the hook shank such that bait threaded upon the hook shank may be threaded over the connector and therebeyond; and
   b. a connector means at the other end of the body to hold the end of a leader.

5. In the connector defined in claim 1, wherein: the end portion of the hook shank includes a disruption means to secure the connector upon the hook shank.

6. In the connector defined in claim 5, wherein: the disruption means includes a plurality of barbs.

7. In the connector defined in claim 5, wherein: the disruption means includes notches in the shank.

8. In the connector defined in claim 4, wherein: the connector means comprises a snell which is integrally formed, with and as an extension of said body.

* * * * *